United States Patent
Kelso (10) Patent No.: US 9,822,426 B2
(45) Date of Patent: Nov. 21, 2017

(54) METHOD FOR RECOVERY OF METALS FROM SULFIDE ORES

(71) Applicant: Jody Kelso, Tucson, AZ (US)

(72) Inventor: Jody Kelso, Tucson, AZ (US)

( * ) Notice: Subject to any disclaimer, the term of this patent is extended or adjusted under 35 U.S.C. 154(b) by 178 days.

(21) Appl. No.: 14/813,389

(22) Filed: Jul. 30, 2015

(65) Prior Publication Data

US 2015/0329936 A1 Nov. 19, 2015

Related U.S. Application Data (63) Continuation of application No. PCT/US2014/014324, filed on Jan. 31, 2014.

(Continued)

(51) Int. Cl.
*C22B 3/18* (2006.01)
*C22B 1/16* (2006.01)
(Continued)

(52) U.S. Cl.
CPC .............. *C22B 3/18* (2013.01); *C22B 1/16* (2013.01); *C22B 11/04* (2013.01);
(Continued)

(58) Field of Classification Search
CPC .. C22B 1/16; C22B 3/18; C22B 11/04; C22B 15/0067; C22B 19/22
See application file for complete search history.

(56) References Cited

U.S. PATENT DOCUMENTS 5,246,486 A 9/1993 Brierley et al.
6,207,443 B1 * 3/2001 King ................... C22B 3/18
                                        435/262
(Continued)

FOREIGN PATENT DOCUMENTS

DE        3637981       5/1988
WO     WO9638381      12/1996
WO   WO2009103025      8/2009

OTHER PUBLICATIONS

Guzman, A., Scheffel, R. and S. Flaherty, The Fundamentals of Physical Characterization of Ore for Leach, in International Symposium Hydrometallurgy (6th: 2008 Phoenix, AZ). Edited by C.A. Young et al., SME.

*Primary Examiner* — George Wyszomierski
*Assistant Examiner* — Tima M McGurthy Banks
(74) *Attorney, Agent, or Firm* — Colorado Patents (57) ABSTRACT

A process for bio-oxidation of sulfides in mineral ore having a metal such as gold occluded or dispersed within the ore as a sulfide is disclosed. The first step comminutes the ore into particles with a size distribution having a P80 of less than 0.25 inch with minus 106 micron particles in the range of 15% to 40% by weight. Agglomerates are formed by adding to the comminuted ore particles an acidic inoculate solution including water, with the solution further including microorganisms capable of bio-oxidizing the sulfides. The agglomerates are then placed in at least one bio-reactor containment vessel to form an ore bed. The process continues by bio-oxidizing the sulfides in the ore bed; then re-circulating the solution through the ore bed, and continuing the bio-oxidation until a desired bio-oxidation level is achieved. Thereafter, the metal is recovered from the ore.

20 Claims, 10 Drawing Sheets

Related U.S. Application Data

(60) Provisional application No. 61/759,929, filed on Feb. 1, 2013.

(51) Int. Cl.
    *C22B 15/00*     (2006.01)
    *C22B 3/00*     (2006.01)

(52) U.S. Cl.
    CPC .......... *C22B 15/0067* (2013.01); *C22B 19/22* (2013.01); *C22B 23/0415* (2013.01); *Y02P 10/234* (2015.11)

(56) References Cited

U.S. PATENT DOCUMENTS

| | | | |
|---|---|---|---|
| 2001/0001065 A1* | 5/2001 | Kohr | B09C 1/10 |
| | | | 435/262 |
| 2005/0112741 A1 | 5/2005 | Kohr | |
| 2010/0058894 A1 | 3/2010 | Uhrie | |
| 2010/0111751 A1 | 5/2010 | Hackl et al. | |
| 2011/0303051 A1 | 12/2011 | Gonzalez et al. | |

\* cited by examiner

$P_{80}$- 940 MICRONS

| INDIVIDUAL | | CUMULATIVE PASSING | |
|---|---|---|---|
| SCREEN FRACTIONS (MICRONS) | WEIGHT PERCENT | MICRONS | WEIGHT PERCENT |
| +1410 | 5.5 | | |
| -1400 +1000 | 9.8 | 1410 | 94.5 |
| -1000 +850 | 21.4 | 1000 | 84.8 |
| -850 +600 | 19.1 | 850 | 63.4 |
| -600 +425 | 10.0 | 600 | 44.3 |
| -425 +300 | 6.6 | 425 | 34.3 |
| -300 +212 | 4.6 | 300 | 27.7 |
| -212 +150 | 3.6 | 212 | 23.1 |
| -150 +106 | 3.0 | 150 | 19.5 |
| -106 | 16.5 | 106 | 16.5 |

FIG. 12

$P_{80}$- 574 MICRONS

| INDIVIDUAL | | CUMULATIVE PASSING | |
|---|---|---|---|
| SCREEN FRACTIONS (MICRONS) | WEIGHT PERCENT | MICRONS | WEIGHT PERCENT |
| +1410 | 0 | | |
| -1400 +1000 | 0 | 1410 | 100.0 |
| -1000 +850 | 0.3 | 1000 | 100.0 |
| -850 +600 | 17.5 | 850 | 99.7 |
| -600 +425 | 15.6 | 600 | 82.2 |
| -425 +300 | 12.2 | 425 | 66.6 |
| -300 +212 | 9.3 | 300 | 54.3 |
| -212 +150 | 7.2 | 212 | 45.0 |
| -150 +106 | 6.3 | 150 | 37.8 |
| -106 | 31.4 | 106 | 31.4 |

FIG. 13

$P_{80}$- 339 MICRONS

| INDIVIDUAL | | CUMULATIVE PASSING | |
|---|---|---|---|
| SCREEN FRACTIONS (MICRONS) | WEIGHT PERCENT | MICRONS | WEIGHT PERCENT |
| +1410 | 0 | | |
| -1400 +1000 | 0 | 1410 | 100.0 |
| -1000 +850 | 0 | 1000 | 100.0 |
| -850 +600 | 3.6 | 850 | 100.0 |
| -600 +425 | 4.7 | 600 | 96.4 |
| -425 +300 | 18.1 | 425 | 91.7 |
| -300 +212 | 14.1 | 300 | 73.5 |
| -212 +150 | 10.1 | 212 | 59.4 |
| -150 +106 | 8.2 | 150 | 49.2 |
| -106 | 41.0 | 106 | 41.0 |

METHOD FOR RECOVERY OF METALS FROM SULFIDE ORES

CROSS REFERENCE TO RELATED APPLICATIONS

This application is a nonprovisional application claiming the benefit under 35 U.S.C. §365(c) of P.C.T. International Patent Application Serial No. PCT/US2014/014324, filed on Jan. 31, 2014 as well as the benefit under 35 U.S.C. §119(e) of U.S. provisional application Ser. No. 61/759,929, filed on Feb. 1, 2013, all of which are incorporated by reference herein.

TECHNICAL FIELD

This invention relates to recovery of metals, especially gold, silver, copper, zinc, nickel and cobalt, from sulfidic ores. More particularly, this invention relates to a bio-oxidation ore treatment process involving preparation of agglomerates using a selected particle size distribution to provide enhanced bio-oxidation and increased ultimate metal recoveries.

BACKGROUND ART

There has been a great deal of interest in recent years in the use of bio-oxidation to recover metals from sulfide ores. In such ores, the sulfides trap, or occlude, the metal particles within sulfide minerals, such as iron pyrite for example. The bio-oxidation techniques use natural microorganisms to catalyze the oxidation of sulfides in the ore into soluble sulfates, in order to adequately expose the metal in the ore for subsequent extraction. Typical metals which may be recovered in this way include gold, silver, copper, zinc, nickel or cobalt.

In recent years, the gold industry has shown a particular interest in the use of bio-oxidation techniques for the recovery of gold, in large part because of the high value of gold. The primary goal of the gold mining industry is cost-effective recovery of gold from ore, and the most commonly used techniques for gold recovery from ore are smelting and cyanidation. However, a great deal of ore is to be found in ore which is naturally resistant to conventional recovery techniques. Such ore is called "refractory," and usually contains gold particles which are locked, or occluded, within sulfide minerals. To obtain adequate gold recovery from such refractory ore, the ore must first be subjected to a pre-treatment process in which the sulfide minerals are degraded by oxidation. The ore may then be treated by a traditional reagent such as cyanide to dissolve the gold, in order to recover the gold from the treated ore.

Such bio-oxidation techniques are particularly useful for pre-treatment of mine tailings, which are the byproducts of mining operations. Not only does this allow gold extraction from highly refractory ores, but it provides the added benefit of removing a barrier to redevelopment and a potential environmental hazard. Bio-oxidation is particularly well suited to the pre-treatment of tailings, as the low gold concentrations found in such tailings are not a problem for the microorganisms involved. The microorganisms simply ignore the waste products in the ore, and proceed to oxidize the sulfides surrounding the gold, often resulting in ultimate extraction recoveries not achievable by other methods One method of bio-oxidation used to pre-treat sulfide-refractory gold ores is heap bio-oxidation, which is described in U.S. Pat. No. 5,246,486 to Brierley et al. In this method, coarsely ground (P80>¼")[1] refractory ores are first agglomerated while being inoculated with a microorganism slurry, then heaped onto a leach pad with aeration and drain lines. This is referred to as a "free-drained" system; i.e., one in which there is no water table within the bed, no part of the bed is flooded, and the water leaves the system drained by gravity. Initially the inoculum is grown in a tank, but after the heap oxidation process matures, the solution draining from the heap contains the organisms and is used as the inoculum. The bio-oxidation continues until the predetermined target level of sulfide oxidation has been achieved. The ongoing sulfide oxidation levels are determined by the analysis of sulfate concentration in the bioreactor effluent solution and the bioreactor effluent cumulative mass flow. Once the bio-oxidation is complete, the ore is removed from the pad and lime is added to neutralize the ore. This makes the microorganisms in the ore become dormant, and also conditions the bio-oxidized ore for cyanide leaching to extract the gold.

[1] "P80" is a commonly used abbreviation in the mining industry, and means that 80% of the ore particles are finer than the specified size—in this case, ¼ inch.

Heap bio-oxidation can permit ultimate gold recoveries in the range of 60-70% from refractory ore. In addition, it uses inexpensive pond liners and allows air addition via high-volume blowers, which are relatively efficient and low-cost. However, heap bio-oxidation suffers from certain inefficiencies, primarily due to the large particle sizes, typically with a P80 of approximately ½ inch and no finer than a P80 of ¼ inch, with −150 [Tyler] mesh[2] (106 microns) fines totaling less than 10% by weight of the total ore (expressed in the industry as P80=¼", <10% −150 mesh). This large particle size causes "channeling," in which water and solution seek large gaps between particles, and thus tend to flow by the ore without making substantial contact. To counter this channeling effect, a relatively high solution application rate is utilized in order to maintain contact with the ore. However, such high solution application rates result in a relatively thick layer of solution around each ore particle which impedes air flow through the heap, so that the oxidation rate is significantly slowed.

[2] A minus sign in front of a size designator, such as mesh or microns, followed by a percentage, is a standard abbreviation used in the mining industry to indicate that the specified percentage of the ore particles are finer than the specified size. In this case, the abbreviation is used to signify that less than 10% of the particles are smaller than 150 mesh (106 microns).

Further, it has long been known that the more finely ground an ore, the more efficiently it may be oxidized and the higher the ultimate gold recoveries would be in the subsequent gold recovery process. This is because as a given quantity of ore is ground into smaller particles, the overall surface area of that quantity of ore is increased. Since an increased surface area increases the contact with the oxidizing solutions, the oxidation proceeds at a faster rate, and is also more complete. However, a great deal of experience with heap leach gold cyanidation led to the conclusion that particle sizes less than P80=¼ inch tended to migrate through the heap, until ultimately they bind together into a clay-like mass, thereby "plugging" the flow of both solution and air through the heap. Since such plugging would render the heap bio-oxidation extremely inefficient, no use of particle sizes smaller than P 80=¼ inch has traditionally been attempted. Unfortunately, this perceived inability of heap bio-oxidation to utilize smaller particle sizes has greatly limited the efficiency and thoroughness of the oxidation achievable with the process. Notably, the typical 60-70% overall gold recovery could potentially be significantly higher if the oxidation were more thorough. In addition, the time for completing the heap bio-oxidation process is typically in the range of 180-360 days, thereby adding substantially to the heap bio-oxidation capital and operating costs. This heap retention time could also potentially be greatly reduced, if smaller particles could be accommodated by the heap bio-oxidation process.

One attempted solution to the above-mentioned problems with heap bio-oxidation has been agitated tank bio-oxidation. Agitated tank bio-oxidation is an alternative to heap bio-oxidation which allows for the utilization of much smaller particles (<100 microns). In this process, large quantities of oxygen and carbon dioxide are dissolved into a finely ground slurry of ore. Plugging problems which might otherwise be associated with such fine particles are avoided by utilizing a mechanically agitated tank to house the process. While such tanks are an effective way to allow very fine particles to be used in the process, they are highly expensive to purchase and to operate, and thus add greatly to the cost of the oxidation. Air addition into the agitated tank is also expensive and difficult to achieve, as the air must be added as extremely fine bubbles, and under sufficient pressure to overcome the pressure associated with the solution depth of the flooded tank. In addition to being costly, the air addition and the tank agitation render the whole process much more complex than traditional heap bio-oxidation. Ultimately, agitated tank bio-oxidation typically results in an accelerated retention time of 5-8 days, with an overall ultimate gold recovery of 85-90%.

There is thus a need for a pre-treatment bio-oxidation process for refractory gold ore which would allow significantly smaller particle distributions to be utilized, thereby greatly improving overall gold recovery and shortening bio-oxidation retention times. Ideally, the process would utilize a free-drained system, and thus would avoid the cost and complexity of agitated tank bio-oxidation.

SUMMARY OF THE INVENTION

The present invention provides a process for bio-oxidation of sulfides in mineral ore having a metal occluded or dispersed within the ore as a sulfide. In particular, the process is suited for recovering gold, silver, copper, zinc, nickel and cobalt. The process begins with the step of comminuting said ore into particles with a size distribution having a P80 of less than 0.25 inch, and minus 106 micron particles in the range of 15% to 40% by weight; and preferably having a P80 in the approximate range of 340 to 950 microns. Agglomerates are then formed by adding to the comminuted ore particles an acidic inoculate solution including water, with the solution further including microorganisms capable of bio-oxidizing the sulfides. The agglomerates are then placed in at least one bio-reactor containment vessel to form an ore bed. The process continues by bio-oxidizing the sulfides in the ore bed; then re-circulating the solution through the ore bed, and continuing the bio-oxidation until a desired bio-oxidation level is achieved. Thereafter, the metal is recovered from the ore, typically with conventional means such as cyanidation.

In view of the foregoing, a number of advantages of the present invention are readily apparent. A method is provided which allows recovery of metals from ore which might otherwise not permit such recovery on an economically feasible basis. The method also improves bio-oxidation kinetics, by providing a faster and more thorough oxidation of sulfides. Finally, the method results in ultimate metal recoveries which are greater than those achievable by other known techniques.

Additional advantages of this invention will become apparent from the description which follows, taken in conjunction with the accompanying drawings.

BRIEF DESCRIPTION OF THE DRAWINGS

The invention will be more readily understood by reference to the accompanying drawings wherein like reference numerals indicate like elements, and wherein reference numerals sharing the same last two digits identify similar corresponding elements throughout the various disclosed embodiments, and in which.

DETAILED DESCRIPTION

Figure 1:
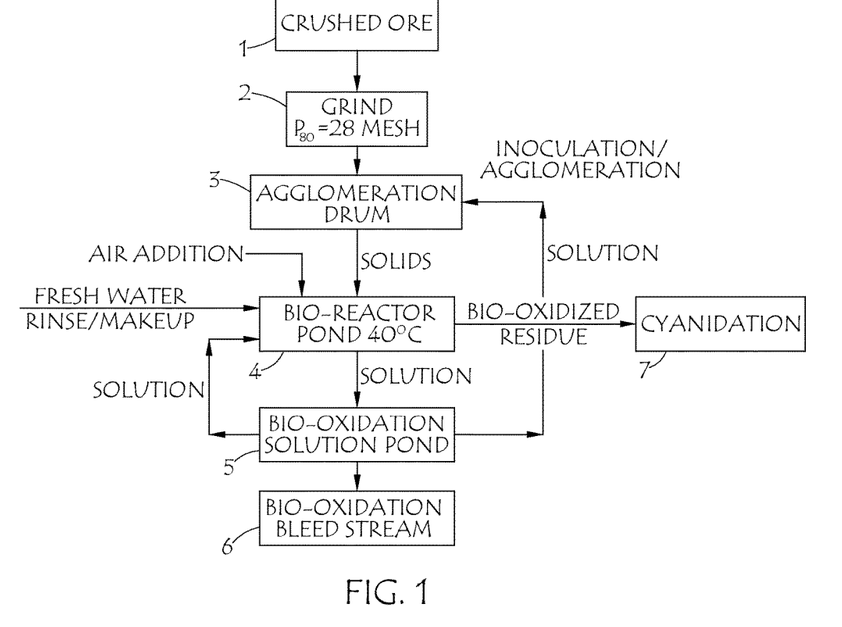
FIG. 1 is a block diagram, showing the steps in the sand farming process.
Figure 2:
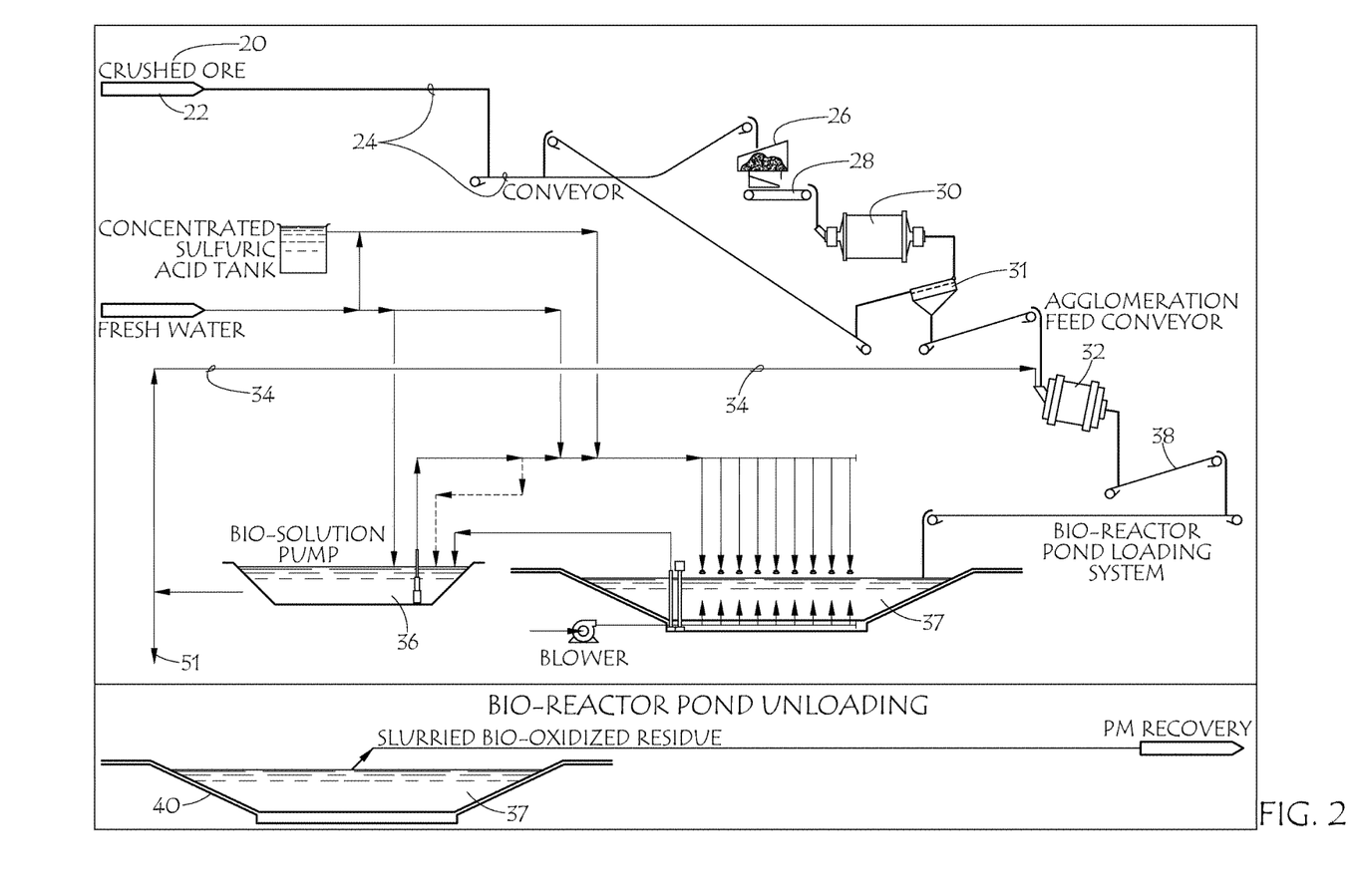
FIG. 2 is a schematic flow diagram depicting the physical flow of ore through the sand farming process.

Referring now to FIGS. 1 and 2, FIG. 1 depicts the sequential stages of the metal recovery process of the present invention in block diagram format, while FIG. 2 shows the physical elements involved in the process. The recovery process is referred to herein as "sand farming," due to the typical particle size distribution employed in the process, which is comparable to the typical size distribution of sand particles. The term "sand farming" has been coined to refer to the process, due to the fact that the process falls under no known category currently found in this technical field.

In the first stage 1, crushed refractory gold ore 20 is stacked in a stockpile 22 (gold has been selected as representative for discussion purposes; however, the process may also be readily applied to recovery of silver, copper, zinc, nickel or cobalt contained in sulfides). Typically the ore 20 contains sulfide minerals which trap or occlude the gold particles in the ore, making the ore unsuitable for conventional recovery techniques. The sand farming process is used to pre-treat the ore to ready it for a more conventional technique, such as cyanidation. In stage 2, the ore 20 is moved to grinding mill 30, where it is comminuted to a pre-selected particle distribution size by grinding or crushing. The ore 20 is moved from the stockpile 22 to the mill 30 by first placing it onto conveyor system 24, which moves the ore to feed bin 26, from where it is transferred to the mill 30 by a belt feeder 28 for grinding to the selected particle distribution size. Alternatively, the ore could be comminuted by crushing in a crusher, although grinding is typically preferred for sand farming.

The desired particle size distribution is determined by lab scale testing to identify the distribution which optimizes several parameters: (1) the rate of bio-oxidation (known as "bio-oxidation kinetics") (2) the level of sulfide oxidation; (3) air addition efficiencies; (4) ultimate precious metal recovery; and (5) total costs. These parameters are evaluated through lab scale test work, which typically includes lab scale testing of multiple particle size distributions, with the determination of the foregoing parameters for each particle size distribution. The estimated costs and revenues for each particle size distribution are then evaluated to determine the most economic particle size distribution for the specific characteristics of each ore type. The costs evaluated include comminution, bio-oxidation, acid neutralization, cyanidation, and gold recovery. The revenues are the total value of the recovered gold.

Any P80 of less than ¼ inch will improve bio-oxidation kinetics and ultimate gold recoveries, when compared to those associated with heap bio-oxidation. The maximum top size (P100) that is best to take full advantage of the sand farming process has been determined by testing to be approximately 10 mesh (1700 microns), while the corresponding P80 is approximately 16 mesh (1000 microns). The minus 150 mesh fraction of the ore should be in the range of 15% to 40% by weight. This range of 15-40% minus 150 mesh particles ensures even distribution of added solution and air. The particle size distributions which have been determined to be optimal for sand farming are unique to sand farming, and will be discussed in detail below.

As part of the grinding process, ore exiting the mill 30 is passed through a screen 31, which diverts ore particles which are larger than the chosen top size for the selected particle distribution, returning them to the conveyor 24, and from there back to the mill 30 for additional grinding. For example, in one sample tested with a target size of P80=600 microns, the chosen screen size was 1000 microns, producing an ore particle size distribution with a top size of 1000 microns. For a P80=300 microns, the screen size would be approximately 600 microns; and for a target of P80=1180 microns, a screen size of 1700 microns has been determined to be appropriate. The correct screen size is somewhat dependent on the grinding characteristics of a given ore, and is ultimately determined by lab scale grinding tests.

Once the ore has been fully ground in Stage 2, it passes on to Stage 3 where it is delivered to an agglomeration drum 32. In the drum 32, an inoculation/agglomeration solution 34, a solution of active microorganism cultures, is agglomerated with the ground ore. The purposes of the agglomeration process are to disperse active microorganism cultures throughout the ore and to adhere the finer sized ore particles to coarser sized ore particles. The agglomeration process creates adequate reactor bed permeability for solution and air addition.

The microbiological cultures utilized for the sand farming process and the production of inoculation/agglomeration solution are a mixture of iron- and sulfur-oxidizing organisms that grow under acidic conditions. The cultures typically consist of *Acidithiobacillus ferrooxidans, Acidithiobacillus thiooxidans* and *Leptospirillum ferrooxidans*. These mesophilic microorganisms grow at ambient-to-warm conditions (about 20° C. to 40° C.). These microorganisms are initially incubated in the solution pond 36 with standard microbial culture growth media and ground samples of the ore to be treated. Once bio-oxidation begins, the inoculation/agglomeration solution is self-generating.

As sulfide oxidation is exothermic and leads to heat production within sand farming bioreactor ponds (The term "pond" is used for the sand farming bio-reactors, but does not imply water-saturated conditions; rather, the bio-reactors actually comprise free-drained ore in a plastic-lined containment space, which typically resembles a "pond" in shape.), it is also advantageous to inoculate/agglomerate ore with metal sulfide-oxidizing microorganisms that will grow only at higher temperatures including the group known as moderate thermophiles, which grow optimally at about 40° C. to 55° C., and extreme thermophiles which grow optimally at about 55° C. to 80° C. Consequently, microbial cultures used in the sand farming process include these three types:

1. Mesophilic microorganisms (described above)
2. Moderately thermophilic microorganisms, composed of organisms such as *Acidithiobacillus caldus, Sulfobacillus thermosulfidooxidans, Leptosprillum ferriphilum* and *Acidimicrobium ferrooxidans*.
3. Extreme thermophile microorganisms consisting of organisms such as *Acidianus brierleyi, Metallosphaera sedula*, and *Sulfolobus metallicus*.

Mixed cultures of each of the three types of microorganisms are grown from ore samples or obtained from culture collections and the initial reactor ore charge is inoculated with all three types of metal sulfide-oxidizing microorganisms. The bio-oxidation reactor can contain zones that operate at any or all of the three temperature ranges. Leach solution application rates or air addition rates may be manipulated to maintain temperatures in the bio-oxidation reactor at a level suitable for growth and sulfide oxidation by one or more of these types of microorganisms.

The quantity of active microorganism culture solution that is added during agglomeration is determined by lab scale test work. This test work includes the evaluation of agglomerate properties at various levels of added microorganism solution, followed by permeability testing of agglomerates produced with the most appropriate moisture addition quantity. The permeability testing includes the determination of the bed permeability at the top, middle and bottom zones of the reactor utilizing the design reactor depth. The most critical test is the determination of the permeability of the agglomerates at the bottom of reactor. This bottom layer of agglomerates must stay permeable under bio-oxidation conditions to ensure that the bio-reactor operates in a free drained mode. The agglomeration and permeability aspects of sand farming are discussed in more detail below.

Figure 3:
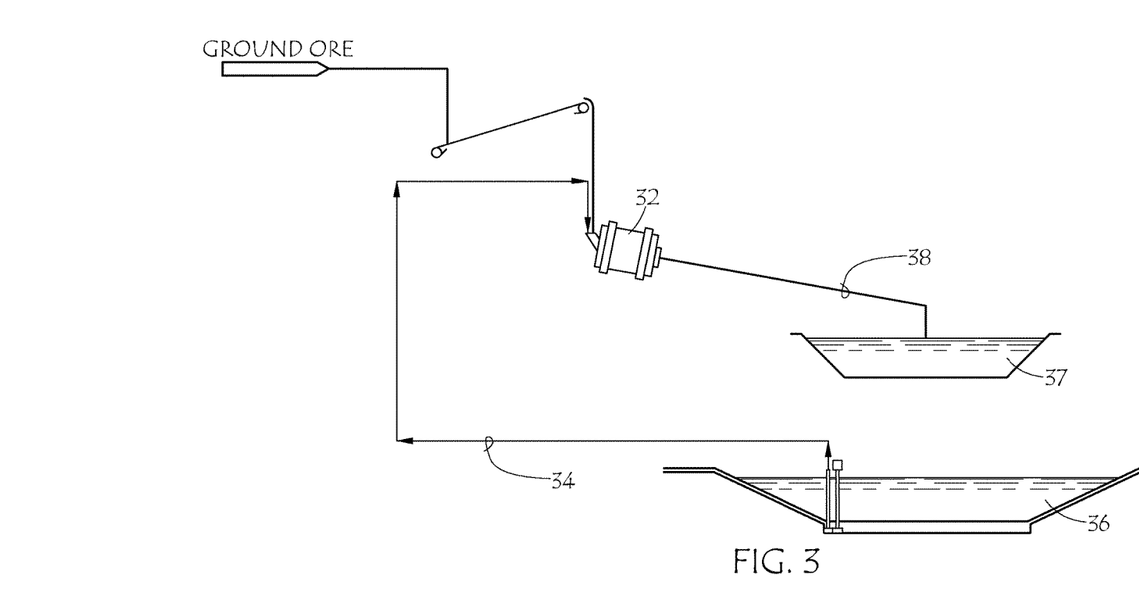
FIG. 3 is a conceptual cutaway view of the bio-reactor pond, showing the loading of the pond with inoculation solution and agglomerated ore.

As may best be seen in FIG. 3, once the agglomeration of the ore with the inoculation solution is completed in Stage 3, the ore agglomerates are loaded into the reactor pond 37 by a conveyor system 38 in Stage 4. A conveyor system is usually preferable, but any loading system may be used, so long as it preserves the integrity of the agglomerates during the loading process. The "integrity" of the agglomerates refers to their ability to maintain adequate permeability for the required levels of air and solution flow, as is discussed in detail below. Examples of mechanical mishandling of the agglomerates include such actions as dropping the agglomerates from a height of ten feet or greater, or operating equipment on the bio-reactor pond.

The bio-oxidation reactor 37 is essentially one of a series of containment vessels with adequate total volume to contain the required quantity of ore for the required period of time to achieve the desired ore production rate. For example, an operation with a production rate of 1,000 tons per day and an oxidation cycle of 60 days would require a total reactor volume sufficient to contain 60,000 tons of agglomerated ore. The pond reactor vessel comprises a waterproof liner 40 typically constructed of acid resistant concrete, acid resistant steel or plastic.

Figure 4:
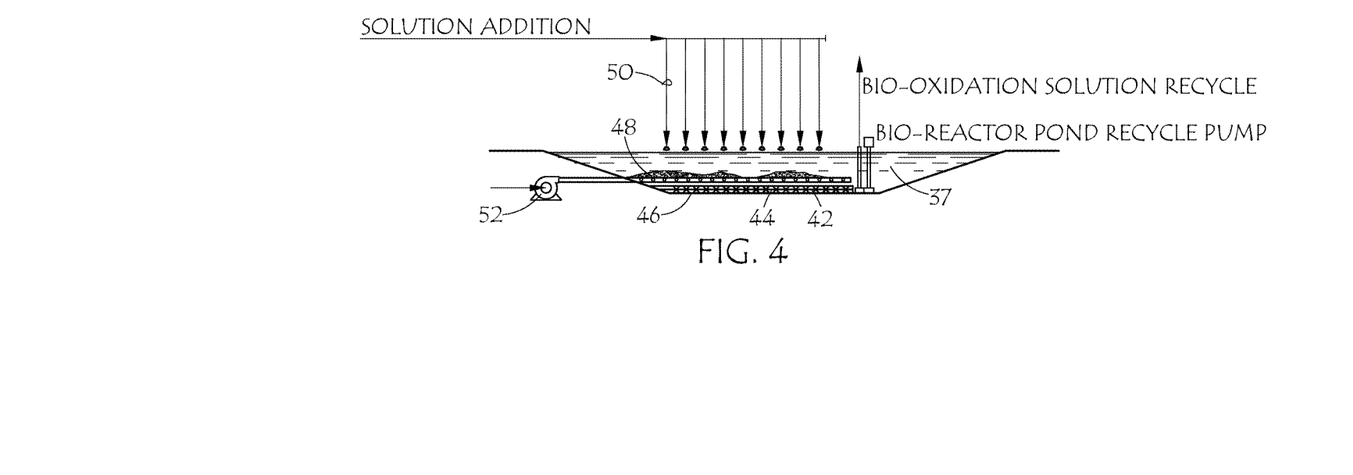
FIG. 4 illustrates the details of the bio-reactor configuration.

Referring now to FIG. 4, the reactor is provided with a drainage layer 42 and a solution collection system 44 on the bottom 46 that allows the collection of the added bio-oxidation solution. The drainage layer 42 and the solution collector system 44 are designed to ensure that no portion of the ore bed 48 is saturated, i.e., the level of solution does not extend past the top of the drainage layer into the ore bed. Saturation of the ore bed would impede air flow and therefore bio-oxidation kinetics, due to the excess water blocking fluid flow and air flow in the macro-pores between the agglomerates. Without adequate fluid flow, solution cannot continually flush the iron and sulfate reaction products from the ore; and without adequate air flow, oxidation is severely inhibited.

Re-circulated bio-oxidation solution 50 is added to the top of the ore bed at a typical application rate of 2.5 to 10.0 liters per hour per square meter. The actual solution addition rate for a given ore type is determined by the lab scale test results. The lab tests utilized to determine the optimum solution application rate include lab scale vat bio-oxidation tests and hydrodynamic column tests. A bleed stream 51 is removed from the bio-oxidation solution circuit to maintain a solution iron concentration of less than 100 grams per liter. The function of the bleed stream is to ensure that no solution constituents build to the point that would negatively impact the bio-oxidation kinetics.

Blower 52 is provided to add air to the bottom of the ore bed 48 at a rate adequate to achieve the desired bio-oxidation rate. The operating temperature of the bio-oxidation reactor is determined by the sulfide sulfur level of the ore and the rate of bio-oxidation. The bio-oxidation rate for a given set of operating parameters can be controlled by the air addition rate. The air addition rate is adjusted to ensure that all components of the bio-oxidation reactor are operating within one or more of the three microorganism types temperature ranges.

The bio-oxidation cycle is allowed to continue until the target level of oxidation of sulfides in the original ore has been reached. This target bio-oxidation level will reflect the optimum economic balance of the costs of bio-oxidation with the revenue from metal recovery, as determined by test work and economic evaluation. Once the target level has been set, measurements and calculations can be performed to determine when the target level has been reached. To begin with, the sulfide content of the ore at the outset of the bio-oxidation process is known. The level of sulfide oxidation at any point in the bio-oxidation cycle may then be calculated from measurements taken of the mass of the effluent solution and its sulfate concentrations. Multiplying the mass of the effluent solution times its sulfate concentration gives the mass of the sulfate which has been placed into solution. This calculated mass is used to calculate the mass of sulfide which has been bio-oxidized. When the target bio-oxidation level has been reached, the bio-oxidation process is terminated.

Figure 5:
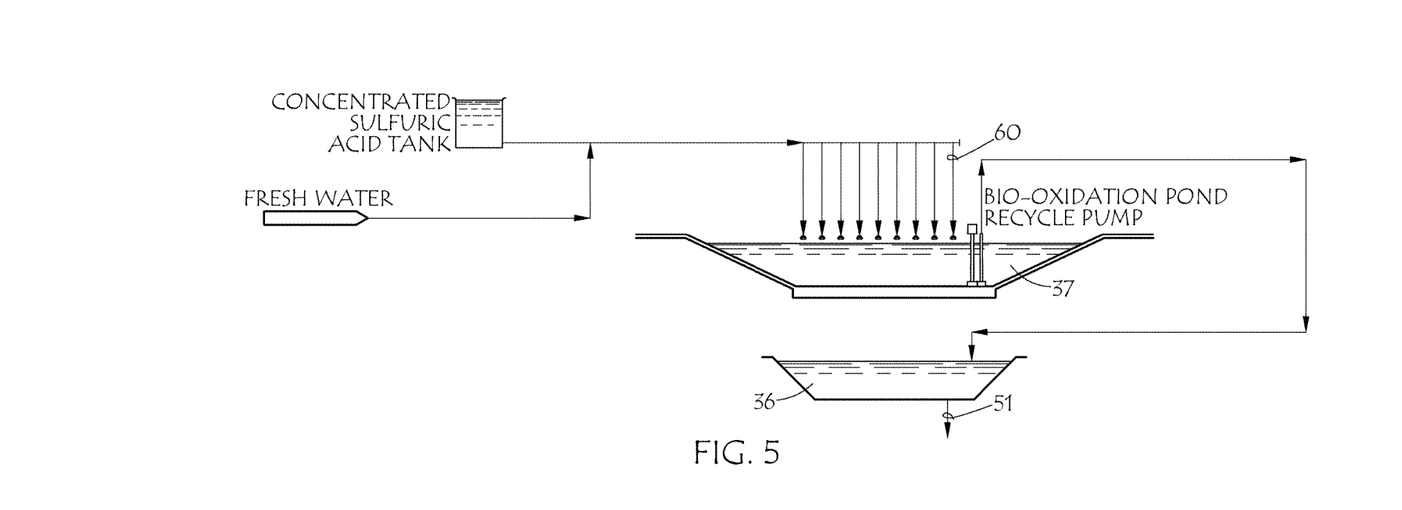
FIG. 5 depicts the weak acid rinse step, as performed using the bio-reactor pond and the bio-solution pond.
Figure 6:
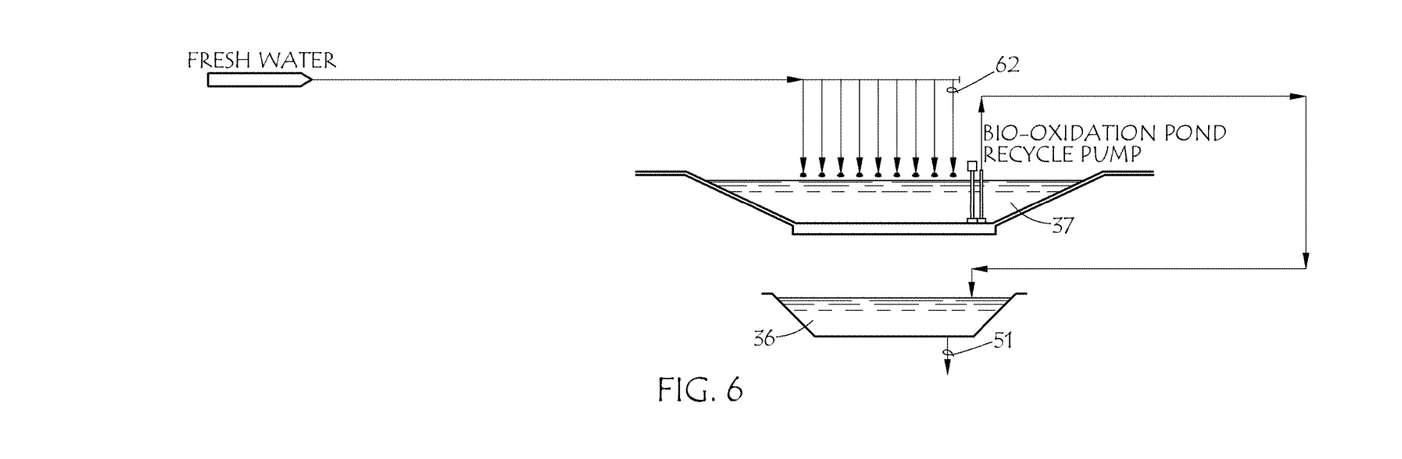
FIG. 6 depicts the fresh water rinse step, as performed using the bio-reactor pond and the bio-solution pond.

Referring now to FIGS. 5 and 6, following the completion of the bio-oxidation cycle the ore is rinsed in place in the reactor to remove residual sulfate species, for example iron, zinc or copper sulfate. The sulfate species are removed because residual sulfate in the contained solution and on the ore particles would consume excess lime during the pH adjustment, as well as cyanide during cyanidation. The first step of the wash cycle consists of the addition of a relatively weak sulfuric acid solution 60 low in sulfates. This acid rinse is useful in preventing precipitation of iron which would occur if only water were used in the rinse process. The second step consists of a fresh water rinse using fresh water 62. Both rinse steps utilize the same solution addition system as utilized for the recirculation of bio-oxidation solution.

The application rates of the rinse solutions are the same or nominally higher than the solution application rate for the addition of the recycled bio-oxidation solution. The quantity of fresh water rinse is typically adjusted to be the same overall flow rate as the combined flow of bio-oxidation solution circuit bleed stream 51 and all other solution losses for the bio-oxidation circuit. This adjustment equalizes the flow of solution into and out of the system, to ensure stable operating conditions. The largest loss of solution from the bio-oxidation circuit is from the bleed stream 51, which is set by solution chemistry. In assessing proper solution chemistry, the target level of equilibrium solution iron level is determined by lab scale test work. Solution iron levels higher than approximately 100 grams per liter have been found to slow the bio-oxidation process.

If the total system losses balance with enough water to rinse the ore, system equilibrium is maintained. If more fresh water is needed to properly rinse, then the bleed stream is increased to a level higher than that required for chemistry reasons. The bleed stream is increased to a level that balances the solution flow into the system required for the rinse. Should the solution losses of the bio-oxidation circuit exceed the fresh water rinse requirement, then makeup water can be added to the bio-oxidation circuit. The makeup water can either be fresh water or from an alternative water source with appropriate solution chemistry. Alternative solution supply would need to be a neutral pH or acidic solution, with levels of Ca, Mg, and sulfates less than 500 ppm.

Once the washing process is complete, the bio-oxidized residue would typically be hydraulically removed from the bio-oxidation with a slurry system 64, typically including a slurry pump. The slurried bio-oxidized residue would then be de-watered to the appropriate percent moisture for introduction into the gold recovery circuit 66. The appropriate moisture level varies with the type of cyanidation to be employed, but would typically be around 50% by weight.

De-watering would typically be accomplished with some combination of a screw classifier, thickener or clarifier, as are commonly utilized in other oxidation processes.

Alternatively, the washed bio-oxidized residue can be partially dried in place with the air addition system and then mechanically removed from the bio-oxidation reactor, for example by using a loader and trucks.

When the ore has successfully completed the first six stages of the sand farming process, the washed and de-watered bio-oxidized ore is ready for Stage 7, the metal recovery circuit. Typically this is accomplished by cyanidation.

Figure 7:
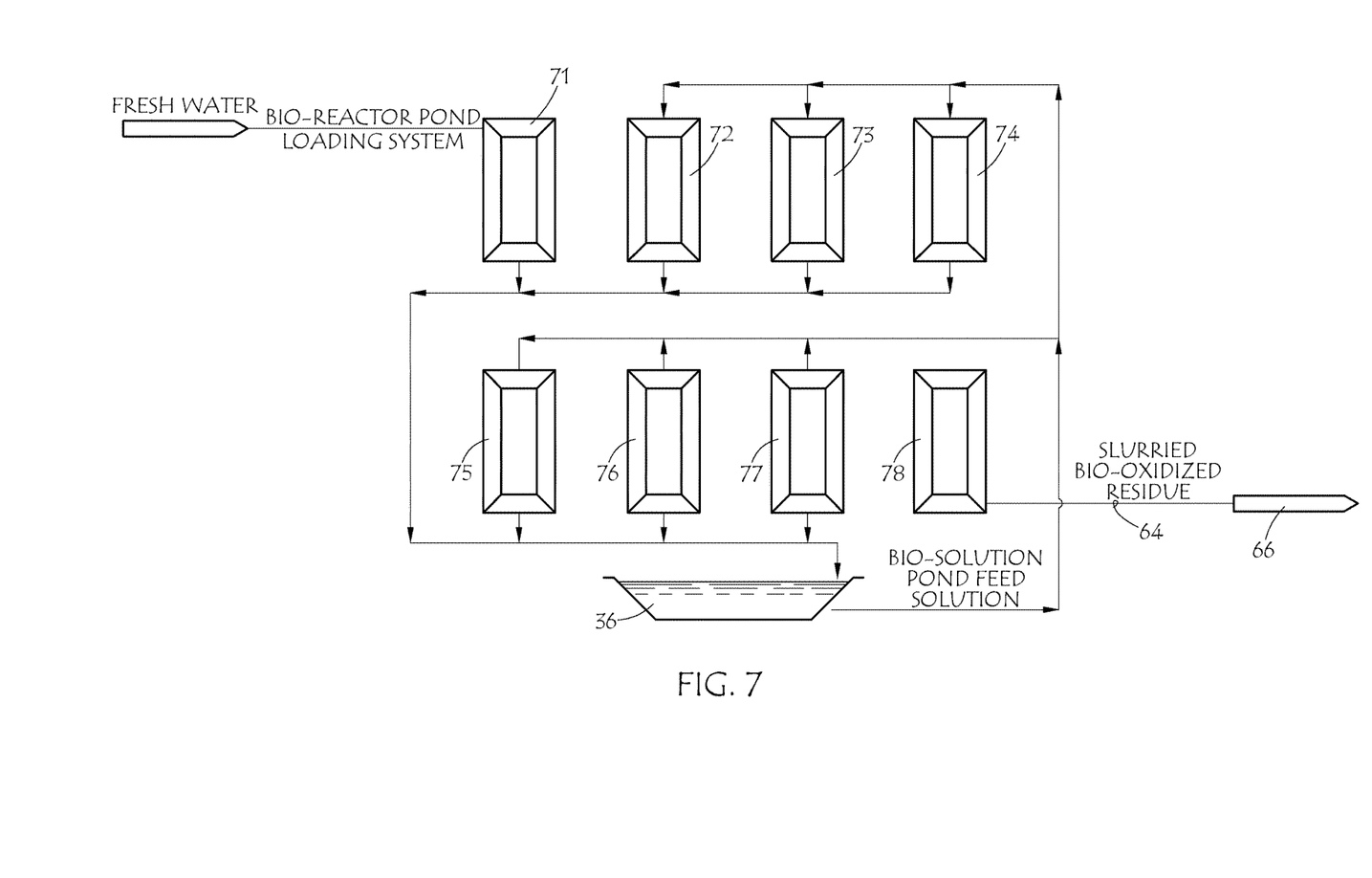
FIG. 7 is a conceptual view of a typical bio-reactor layout utilizing multiple ponds.

FIG. 7 shows a typical bio-reactor layout, utilizing multiple ponds. A total of eight separate ponds 71-78 are depicted in FIG. 7, although more or less ponds might be utilized, depending upon the economics of the particular operation. As the sand farming process is in operation, there is always one bio-reactor pond in the loading stage and one bio-reactor pond in the unloading stage. The remainder of the ponds are operating in sequential stages of the sand farming process. This use of multiple ponds operating in various stages allows for flexibility in adjusting the reaction time to accommodate various ore types.

Agglomeration Properties

The agglomeration properties of the ore particles are central to the improved efficiency achieved by sand farming. A well-agglomerated ore provides optimal system flow and oxidation kinetics, while avoiding the problems of channeling and plugging. This in turn significantly enhances the final gold recovery. The desired agglomeration properties result from several primary principles of agglomeration, as discussed below. A more detailed discussion may be found in the following paper, which is incorporated by reference herein: Guzman, A., Scheffel, R. and S. Flaherty, *The Fundamentals of Physical Characterization of Ore for Leach*, in International Symposium Hydrometallurgy (6$^{th}$: 2008 Phoenix, Ariz.). Edited by C. A. Young et al., SME.

Figure 8:
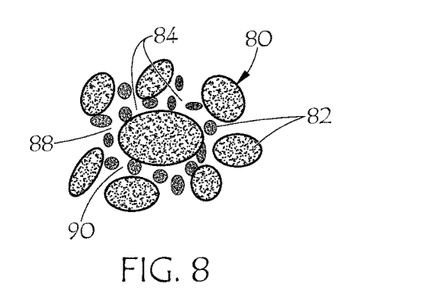
FIG. 8 is a conceptual representation of a typical agglomerate of the invention, showing the micropore solution between the individual ore particles.
Figure 9:
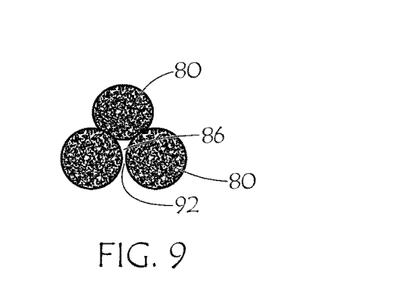
FIG. 9 is a conceptual representation of a typical group of agglomerates of the invention, showing the macropore solution between the individual agglomerates.
Figure 10:
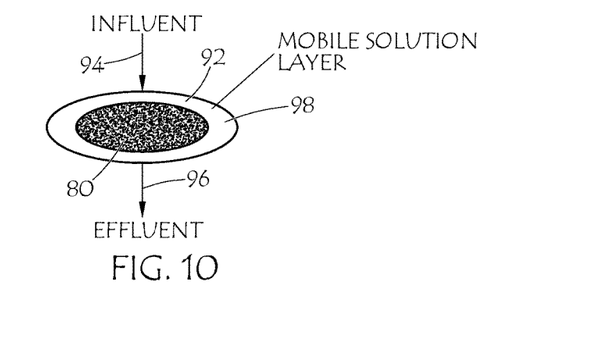
FIG. 10 is a conceptual representative of a typical agglomerate under steady state bio-oxidation conditions, showing the mobile solution layer around the agglomerate.

Referring now to FIGS. 8-10, a well-agglomerated ore is depicted. An ore agglomerate 80 is formed of individual ore particles 82, adhered to one another due to surface charges which bind the particles together. The agglomeration results in spaces 84 between particles, known as "micropores;" and spaces 86 between agglomerates, referred to as "macropores." During the sand farming agglomeration process, bio-oxidation solution 88 fills in the micropores, and remains there as a layer 90 in an essentially non-mobile state throughout the process. The bio-oxidation process takes place within this micropore solution layer.

As seen in FIG. 9, during the same bio-oxidation process, a mobile solution 92 also flows through the macropore space 86. This macropore solution must remove bio-oxidation products at a sufficient rate so that the build-up of bio-oxidation products in the micropore solution does not limit the rate of the bio-oxidation reaction. Air passes through the non-mobile micropore solution to provide oxygen to the sulfide surface where the bio-oxidation reaction takes place.

If ore particles are not well-agglomerated, the majority of the pore volume is present as micropores, and there is an inadequate volume of macropore space to allow solution to pass through the system. The classic case of this over-abundance of micropores would be a bed of fine clay. Because of the shortage of macropores, the bed would plug with the addition of solution, due to the inability of solution to pass through the bed. Thus the system would not allow the adequate flow of solution to remove reaction products; nor would it allow sufficient air flow to fuel the bio-oxidation process.

On the other hand, the particle size distribution of a typical bio-heap treatment results in an excess of macropore volume as compared to micropore volume. Therefore the agglomerates are prone to solution channeling, resulting in inefficient removal of bio-oxidation reaction products due to insufficient contact with the micropore solution. In addition, a thicker solution surrounds the individual ore particles, resulting in slower air addition to the reaction surface and slower reaction kinetics.

The most effective agglomeration will therefore produce an optimum balance between micropore and macropore volumes. Agglomeration of ore particles is greatly influenced by their particle size distribution. As the mean particle size of ore is reduced, the associated mean surface area increases exponentially. This means that the smaller particle sizes utilized in sand farming typically result in an overall particle surface area several times that found in the usual heap bio-oxidation treatment. Since the density of an ore particle is essentially the same regardless of the particle size, the ratio of sulfide surface area to weight for sand farming particles is substantially higher than for bio-heap particles.

As the adherence of the ore particles into agglomerates is primarily due to the attractive sulfide surface charges, the agglomerates produced in sand farming are greatly improved in quality as compared to previously known bio-oxidation processes, such as heap bio-oxidation. These improved agglomerates allow the sand farming process to utilize the preferred finer ore particle sizes for free-drained bio-oxidation. The improved adherence properties include the physical characteristics of not falling apart during pond loading, or under solution addition with ore stacked on top of it. In addition, it keeps its permeability under those conditions. By contrast, weaker agglomerates formed with lesser adherence properties will fall apart under those conditions, causing the ore bed to plug.

Still further, the sand farming particle distribution and the unique agglomeration formation process caused by the sulfide surface area and individual particle densities has been determined through testing to result in a ratio of total micropore to macropore volume in an ore bed of approximately 1:1. Such a 1:1 ratio has been shown by a great deal of hydrodynamic testing to reach an optimal balance point, avoiding the problems of channeling and clogging which plague un-balanced systems. In this way, sand farming achieves optimal overall bio-oxidation system kinetics. By contrast, the bio-heap process typically results in a ratio of approximately 70% macropores to 30% micropores, or even as extreme as 85-15%. This causes inefficient kinetics, with much of the mobile solution traveling through the ore bed with little contact with the ore.

The balance of micropore and macropore volumes ensures that the sand farming ore bed achieves adequate permeability to allow the requisite quantities of solution and air addition, while minimizing the thickness of the solution layer surrounding each particle, thereby maximizing the reaction product removal and air addition Once the ideal particle size distribution has been achieved, bio-oxidation solution is added to the ore in the agglomeration process. The amount of solution to be added is determined by laboratory test work, which includes adding varying amounts of solution to ore samples while mixing in a rolling reactor, resulting in several agglomerates from which to choose. The agglomeration recipe that produces the most physically stable agglomerates with no excess solution is then chosen for sand farming treatment.

The agglomerates are then loaded into the bio-reactor pond at the "as agglomerated" moisture content. The ideal agglomeration solution addition quantity is primarily a function of particle size, with the percentage of minus 106 microns particles being the most important aspect. Solution added to the ore during agglomeration is typically in the range of 8-15% by weight, with approximately another 1-3% being added to achieve a steady state. The agglomerates may be allowed to cure for approximately one to five days, to allow them to further harden. Next, solution is added to the top of ore bed. Steady state bio-oxidation conditions are reached when the solution flow rate into the ore bed equals the solution flow rate out of the ore bed. The ore bed then remains in the steady state bio-oxidation condition until bio-oxidation is complete.

Hydrodynamic tests are also conducted, with the results used to determine:

Density of the ore bed;

Volumes of micropore and macropore void spaces; and

Maximum air addition rates for the typical range of solution application rates of 2.5 to 10.0 liters per hour per square meter (based upon years of commercial scale operation, and sand farming test work).

Referring now to FIG. 10, a conceptual representation of a typical agglomerate under steady state bio-oxidation conditions is depicted. Steady state bio-oxidation condition is the equilibrium state where the flow rate of solution into the ore bed, the influent 94, equals the flow rate of solution out of the ore bed, the effluent 96.

Under steady state conditions a layer 98 of macropore solution is in contact with the surface of each agglomerate. The air required for sulfide sulfur oxidation flows into the ore bed through this mobile solution. The sulfide sulfur reaction products are also removed from the system by this mobile solution, which travels through the macropore void spaces of the ore bed.

The macropore void spaces must have adequate volume to allow the efficient introduction of air into and the transport of sulfide sulfur reaction products out of the system. The solution within the micropore void spaces is essentially stagnant. The micropore void spaces are filled with bio-oxidation solutions during the agglomeration process. The sulfide sulfur bio-oxidation reaction takes place on the surface of each ore particle within the stagnant solution located in the micropore void spaces.

The air introduced in the system and sulfide sulfur reaction products removed from the system must migrate through the stagnant micropore agglomeration solution to the mobile macropore solution layer to be transported in and out of the system. The migration of the air is driven by the pressure of the added air. The migration of the reaction products is driven by concentration gradients, i.e., at the boundary between two solutions, the reaction products tend to move from the solution where they have a greater concentration to the solution where they have a lesser concentration. For this reason, the bleed stream is removed from the bio-oxidation solution circuit to maintain a solution iron concentration of less than 100 grams per liter. This ensures that the iron concentration does not build to the point that would excessively impair the concentration gradient, and thus negatively impact the bio-oxidation kinetics.

The sulfide sulfur bio-oxidation kinetics under these conditions are controlled by the rate of air addition to the sulfide surface of the ore. The greater the rate of air addition to the sulfide surface, the greater the delivery of necessary oxygen to fuel the oxidation process; and the thinner the layer of the mobile macropore solution layer, the easier the air can migrate to the ore surface. However, the flow of the mobile macropore solution must also be adequate to remove sulfide sulfur reaction products from the surface of the ore particles so that sulfide sulfur reaction products in the stagnant micropore solution do not increase to a solution concentration that inhibits the bio-oxidation kinetics.

Therefore, the ideal agglomeration and subsequent steady state bio-oxidation condition would be procedures or processes which produce the thinnest layer of mobile macropore solution around the agglomerates, consistent with still providing adequate macropore solution flow to allow the migration of the sulfide sulfur reaction products through the stagnant micropore solutions into the mobile macropore solution being removed from the system.

A vast amount of laboratory scale, pilot plant scale and commercial scale test work has been completed to determine the ideal agglomeration and steady state bio-oxidation operating parameters. These results indicate that the most ideal bio-oxidation conditions are achieved when the system has an even balance of micropore and macropore void space volume.

The difference in weight of the ore bed at steady state condition versus the weight of the ore bed in the as loaded ("as agglomerated") condition is the quantity of solution in the mobile macropore solution. For the example case utilized for the bio-oxidation results presented in FIGS. 12 through 14, the "as agglomerated" moisture content is 11.5% by weight. The moisture content at steady state bio-oxidation condition is 12.5%. This means that the quantity of mobile macropore solution is only 1% of the dry weight of the ore.

For bio-heap steady state conditions, the quantity of mobile macropore solution is typically in the range of 2-5% of the dry weight of the ore. As the particle size distribution utilized for sand farming treatment contains substantially more surface area than the particle size distribution utilized for heap bio-oxidation and the mobile macropore solution quantity is less for sand farming treatment, the mobile macropore solution layer is necessarily substantially thinner in the sand farming treatment process.

The thinner layer of mobile macropore solution utilized in sand farming results in bio-oxidation rates in the range of 0.5 to 1.5% of the total sulfide sulfur per day compared to the 0.2 to 0.3% of the total sulfide per day typically achieved in heap bio-oxidation. The substantially greater quantity of available sulfide surface area for ore ground to the particle size distribution utilized for sand farming allows the achievement of sulfide surface bio-oxidation levels of greater the 85% while the maximum level in bio-heap treatment is typically in the range of 60 to 70%. The increased level of sulfide sulfur bio-oxidation for sand farming thus results in substantially increased gold recoveries.

EXAMPLE

Referring now to FIGS. 11-20, an example is presented which illustrates a typical evaluation process to be followed in preparation for a metal-recovery project using sand farming. Each sand farming project presents its own conditions, which in turn determine the optimum range of particle size distributions to be selected for the comminuted ore. For example, the ore mineralogy, its sulfide content, and the location of the metal within the mineral lattice are all critical factors in determining the particle distribution which will yield the best results for sand farming.

To begin the evaluation process, an estimated range of possible particle size distributions ranging from fine to coarse was first selected. This range was based on experience with bio-oxidation processes generally, and was chosen to be sufficiently broad so as to include the finest and coarsest distributions which could potentially work for the project, along with an intermediate-sized particle distribution.

Figure 11:
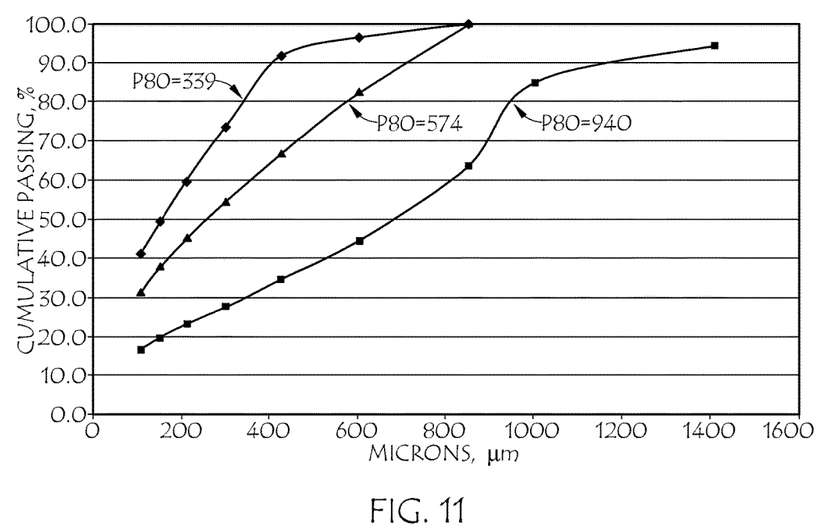
FIG. 11 is a graphical representation of the range of particle size distributions suitable for the sand farming treatment process, showing the ideal, fine, and coarse size distributions.
Figure 12:
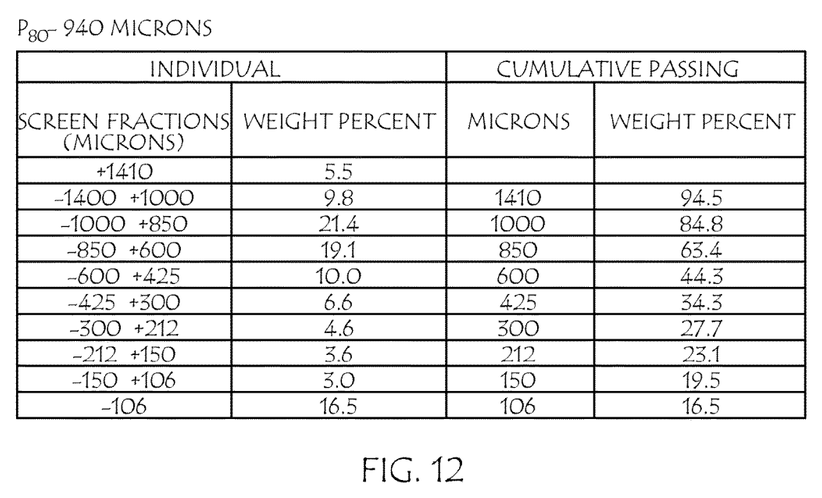
FIG. 12 is a table presenting the results of the screen tests of the coarse particle size distribution of FIG. 11.
Figure 13:
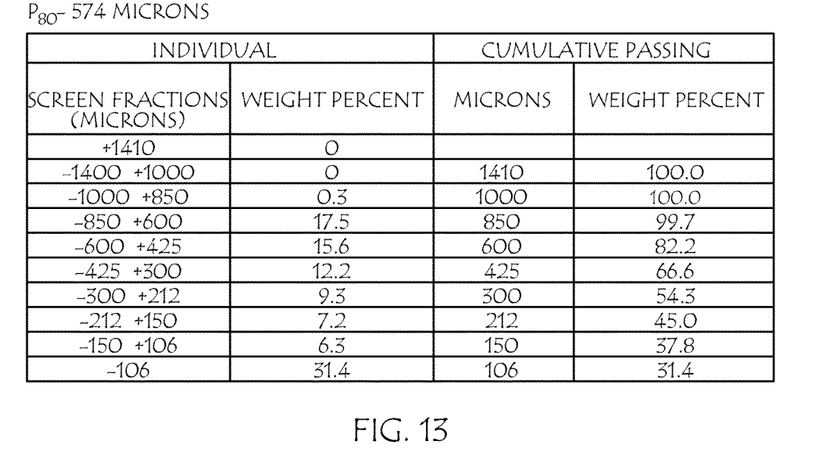
FIG. 13 is a table presenting the results of the screen tests of the ideal particle size distribution of FIG. 11.
Figure 14:
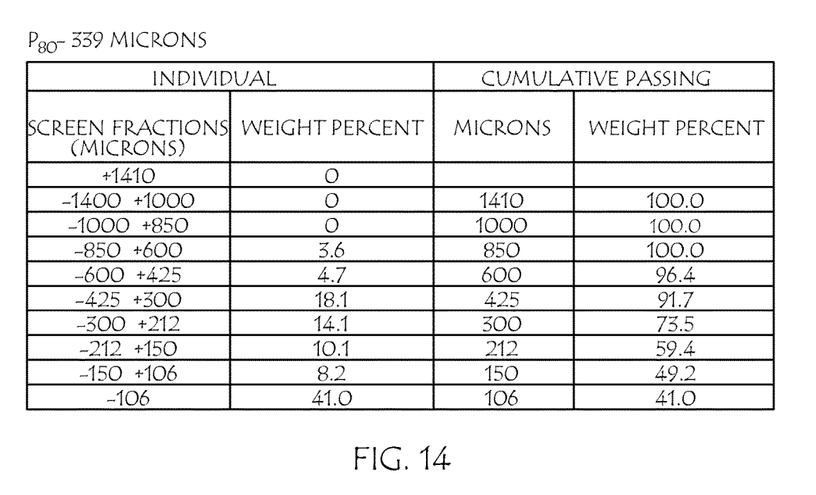
FIG. 14 is a table presenting the results of the screen tests of the fine particle size distribution of FIG. 11.

Referring now to FIGS. 11-14, data is presented showing the range of particle size distribution selected for evaluation in the present example. FIG. 11 presents the data in graphical format, while FIGS. 12-14 show the same date in table format, giving the numerical values represented in FIG. 11. The presented particle size distributions are the measured values of the three samples utilized for testing in this example. These values show the distribution of particle sizes produced throughout the potential range of particle sizes with the chosen target P80 and percent passing 106 micron values. The three tables represent the coarsest particle size target (FIG. 12) the intermediate (ideal) particle size target (FIG. 13) and the finest particle size target (FIG. 14).

The two most pertinent aspects of the particle size distribution are the P80 and the percentage of ore that is finer than 106 microns. The P80 target particle size is typically the primary value utilized in the design of an ore comminution circuit. For sand farming treatment in this example, the target P80 values range from a low of approximately 340 microns to a high of approximately 950 microns, with the ideal value typically in the range of 580 microns.

The percentage of minus 106 microns is important to sand farming treatment, as this value is paramount to the overall surface area of the ore to be treated. As the surface area of an ore particle increases exponentially with the reduction in size of the ore particle, the presence of the target range of minus 106 microns of 15% to 40% ensures that the ore charge has adequate surface area to produce physically stable agglomerates. The adherence of the individual particles into physically stable agglomerates is primarily due to the attractive surface charges of the sulfide surfaces. Therefore, the greater quantity of overall sulfide surface area for a given weight of ore, the more physically stable are the produced agglomerates. In contrast, in heap bio-oxidation the minus 106 micron percentage is limited to less than 10%.

The testing of the three selected samples was begun by subjecting each of them to a series of agglomeration tests, with acidic bio-oxidation solution added in differing amounts from 1.5% to 11.5%. The test was performed by agglomerating the ore of each sample at each level of moisture, and then observing the qualities of the agglomerates which were thus formed. To be acceptable, an agglomerate would have particles sticking together in a shape approximating a ball. Unacceptable agglomeration would generally involve particles not sticking together, in which case it is predictable that they will plug under load in operating conditions; or conversely, it involves agglomerates which are excessively mush-like, in which case they would also plug under load in operating conditions. When this agglomeration test was performed, the finest particle size distribution produced no agglomerates which held together at any level of moisture. That particle distribution was therefore discarded as an option, and no further testing was performed on it. The coarse and intermediate particle distributions produced acceptable agglomerates at 6% and 11.5% moisture levels.

The coarse and intermediate particle distributions with moisture levels of 6% and 11.5% were then subjected to hydrodynamic testing designed to ascertain whether they were permeable and their agglomerates maintained their integrity under simulated operating conditions. In this testing, a load simulating the bottom 1 meter of a 5 meter ore bed was applied to agglomerates formed from the two distributions. Varying air flows and solution flows were then passed through the agglomerates. The air flows ranged from 100 to 1000 liters per day per kilogram of sulfide sulfur; solution flows ranged from 1.25 to 12.5 liters per hour per square meter of reactor bed surface area. Both particle distributions were found to perform acceptably and roughly comparably under these conditions, and both particle distributions performed best at a moisture content of 11.5%.

Based on the foregoing tests, the intermediate particle solution was determined to be the best particle distribution for this example, and was selected for further testing to determine its bio-oxidation kinetics and its expected ultimate gold recovery. Although the coarse distribution performed comparably on the preliminary tests, the intermediate particle distribution was selected over the coarser particle distribution because it was the finer distribution of the two. Being the finer distribution of the two, the intermediate distribution would be expected to oxidize faster and more thoroughly than the coarse distribution, due to its greater surface area available for oxidation.

Figure 15:
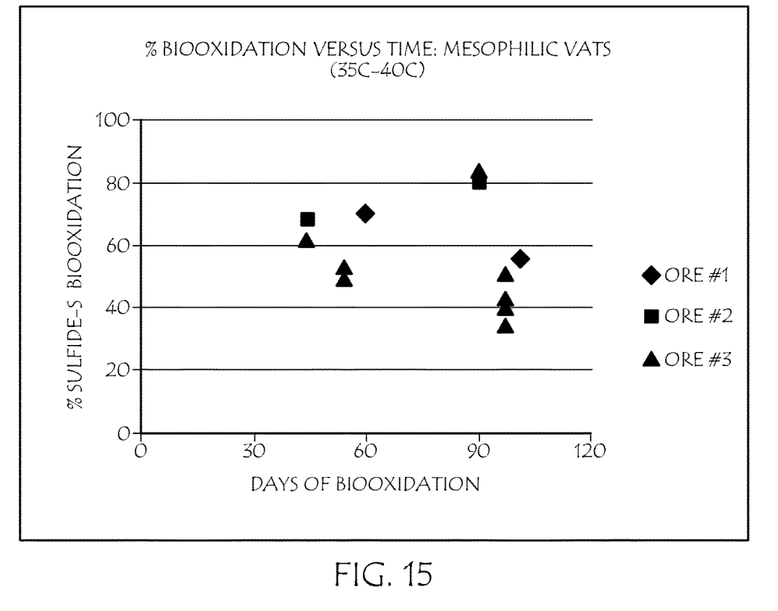
FIG. 15 is a graphical representation of the level of sulfide bio-oxidation versus time for mesophile microorganisms.
Figure 16:
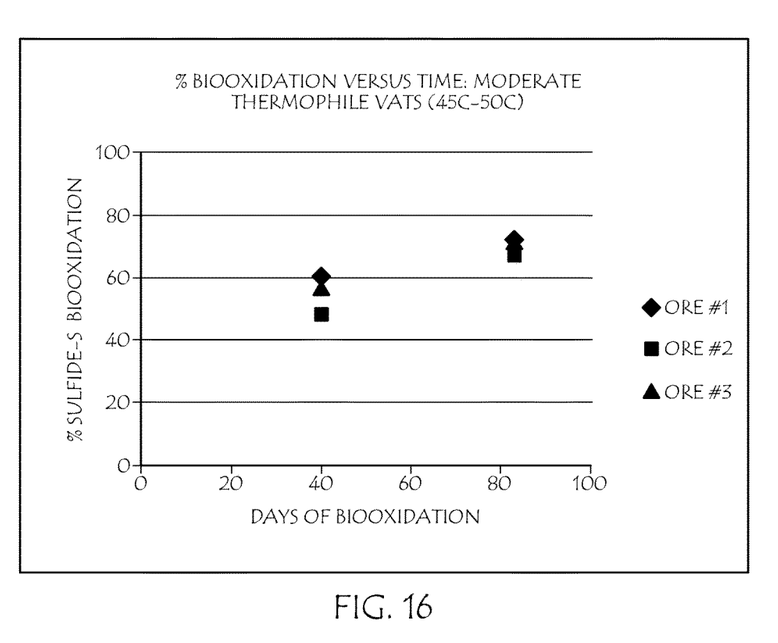
FIG. 16 is a graphical representation of the level of sulfide bio-oxidation versus time for moderate thermophile microorganisms.
Figure 17:
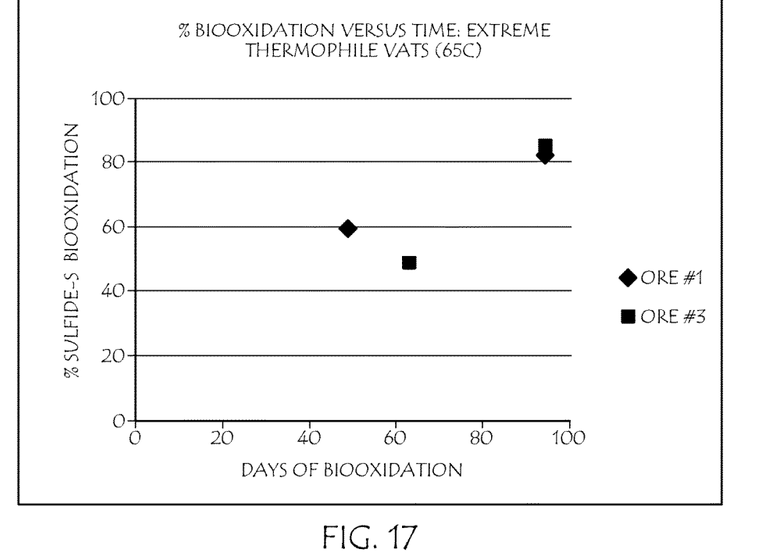
FIG. 17 is a graphical representation of the level of sulfide bio-oxidation versus time for extreme thermophile microorganisms.

FIGS. 15 through 17 present the bio-oxidation test results of the ideal particle size distribution sample for the previously described three typical temperature operating zones, and the microorganism types that are common to those temperature ranges. Positive bio-oxidation test results for each of three identified temperature ranges is relevant as the sand farming bio-oxidation pond will typically include zones operating at two or more of these temperature ranges. Most importantly, the test results indicated a bio-oxidation rate of 0.5 to 1.5% of the total sulfide sulfur per day, a rate which is 2 to 4 times faster than would be expected with a typical heap bio-oxidation treatment process. With the 0.5% to 1.5% bio-oxidation rate, a bio-reactor retention time of 30-90 days may be expected, compared with a 180-360 day retention time for a typical heap bio-oxidation process. In addition, the sand farming process would result in approximately an 80% bio-oxidation level at completion, as compared to a 60% level with the heap bio-oxidation process. Thus the sand farming bio-oxidation rate is clearly commercially feasible, and in fact is highly competitive.

The relatively high operating temperatures of the sand farming bio-oxidation pond are due to the heat produced during the oxidation of sulfide sulfur. The relatively fast sand farming bio-oxidation rates of 0.5 to 1.5% of the total sulfide sulfur per day results in internal bio-oxidation temperatures in the higher temperature ranges.

Figure 18:
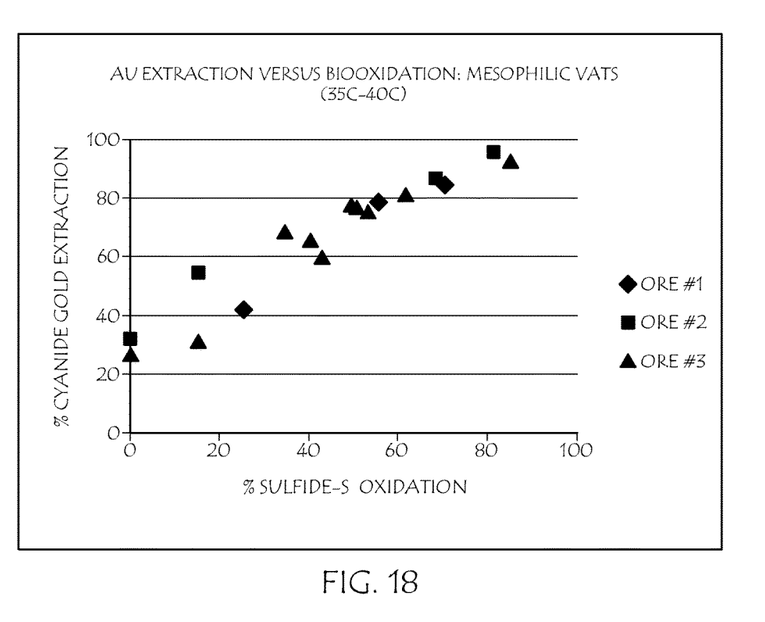
FIG. 18 is a graphical representation of gold extraction versus the level of sulfide bio-oxidation for mesophile microorganisms.
Figure 19:
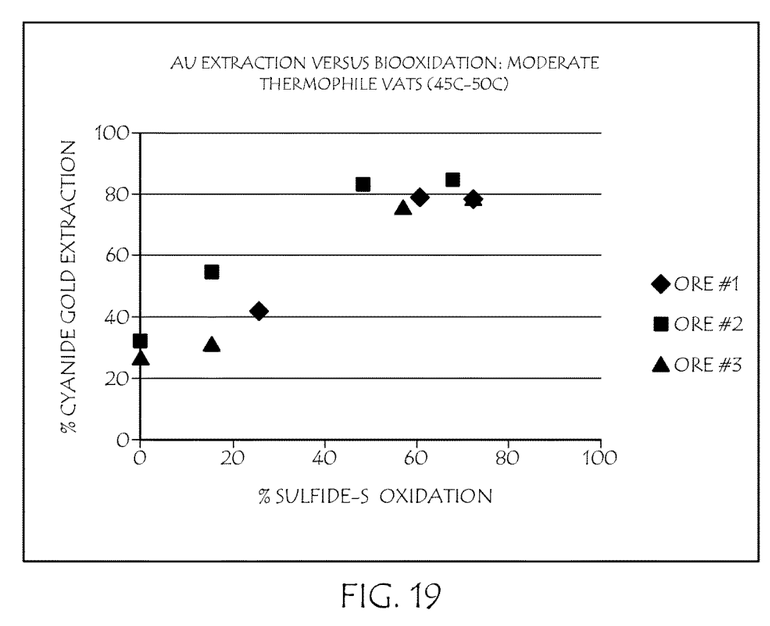
FIG. 19 is a graphical representation of gold extraction versus the level of sulfide bio-oxidation for moderate thermophile microorganisms.
Figure 20:
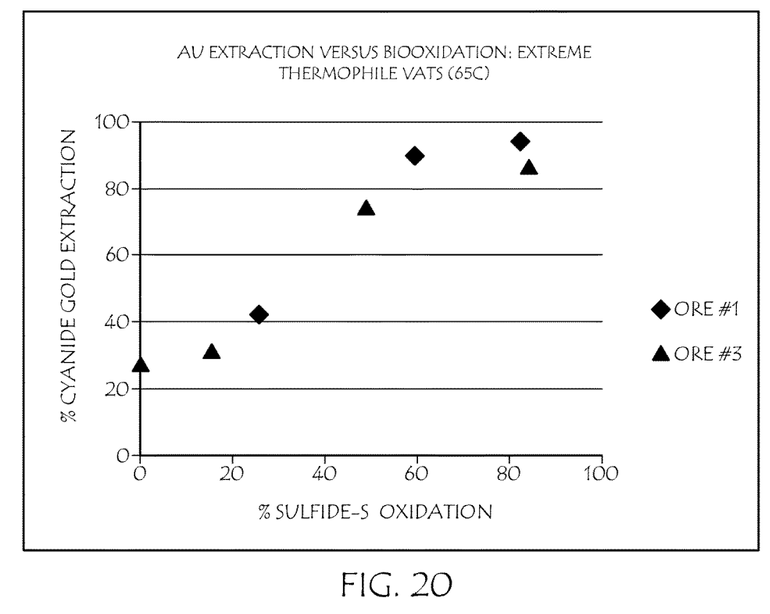
FIG. 20 is a graphical representation of gold extraction versus the level of sulfide bio-oxidation for extreme thermophile microorganisms.

FIGS. 18 through 20 present the cyanide gold extraction of the ideal sand farming particle size distribution versus the level of sulfide bio-oxidation. This information is utilized to determine the most economically positive level of sulfide sulfur oxidation for a given ore type. The best economics are achieved by balancing the cost of the bio-oxidation process with the revenue from the extracted gold. The test results show gold extraction falling primarily in the 85-95% range for each of the three microorganism vats tested. This compares more than favorably with the typical heap bio-oxidation operation, which would be expected to show a recovery of around 65%. This results in large part from the limitations on maximum bio-oxidation achievable with heap operations, due to the coarse particle distributions utilized in such processes. Typically the maximum bio-oxidation with heap treatment processes is around 60%, whereas the tests indicate that bio-oxidation levels of 75-85% are achievable with sand farming.

This invention has been described in detail with reference to a particular embodiment thereof, but it will be understood that various other modifications can be effected within the spirit and scope of this invention.

I claim:

1. A process for bio-oxidation of sulfides in mineral ore having a metal occluded or dispersed within said ore as a sulfide, comprising the steps of:
comminuting said ore into particles with a size distribution having a P80 of less than 0.25 inch, and minus 106 micron particles in the range of 15% to 40% by weight;
forming agglomerates by adding to said comminuted ore particles an acidic inoculate solution including water, said solution further including microorganisms capable of bio-oxidizing said sulfides;
placing said agglomerates in at least one bio-reactor containment vessel to form an ore bed;
bio-oxidizing said sulfides in said ore bed; and
re-circulating said solution through said ore bed and continuing said bio-oxidation until a desired bio-oxidation level is achieved; and
thereafter recovering said metal from said ore.

2. A process for bio-oxidation as claimed in claim 1, wherein said metal is selected from the group consisting of gold, silver, copper, zinc, nickel and cobalt.

3. A process for bio-oxidation as claimed in claim 2, wherein said metal is gold.

4. A process for bio-oxidation as claimed in claim 1 wherein the agglomerates formed have a micropore to macropore volume ratio of about 1:1.

5. A process for bio-oxidation as claimed in claim 1 wherein the agglomerates formed have a micropore to macropore volume ratio of greater than 3:7.

6. A process for bio-oxidation as claimed in claim 1 wherein the agglomerates formed have a micropore to macropore volume ratio ranging from 1:2 to 2:1.

7. A process for bio-oxidation as claimed in claim 1 wherein said ore has a dry weight before said inoculate solution is added to said comminuted ore particles and wherein said agglomerates have spaces between them referred to as macropores and wherein the amount of said inoculate solution in the macropores of the agglomerates is about 1% of the dry weight of the ore when a steady state bio-oxidation condition is achieved.

8. A process for bio-oxidation as claimed in claim 1 wherein said ore has a dry weight before said inoculate solution is added to said comminuted ore particles and wherein said agglomerates have spaces between them referred to as macropores and wherein the amount of said inoculate solution in the macropores of the agglomerates is less than 2% of the dry weight of the ore when a steady state bio-oxidation condition is achieved.

9. A process for bio-oxidation as claimed in claim 1 further comprising supplying the ore bed with oxygen to enhance the bio-oxidation process.

10. A process for bio-oxidation as claimed in claim 9 wherein the oxygen is supplied to the ore bed via air.

11. A process for bio-oxidation as claimed in claim 9 wherein the ore bed has a surface and wherein the oxygen supplied to the ore bed is supplied at a rate which is adjusted to maintain the oxygen content of the air exiting the surface of the ore bed at a predetermined threshold level.

12. A process for bio-oxidation as claimed in claim 1 wherein the solution has an iron concentration which is maintained so that it less than or equal to 100 grams per liter of solution.

13. A process for bio-oxidation as claimed in claim 1 wherein said ore bed has a bottom layer of agglomerates and wherein said step of bio-oxidizing said sulfides in said ore bed is carried out in a free drained mode to ensure that the bottom layer of agglomerates is permeable.

14. A process for bio-oxidation as claimed in claim 1 wherein said microorganisms include mesophilic microorganisms.

15. A process for bio-oxidation as claimed in claim 14 wherein said microorganisms further include thermophilic microorganisms.

16. A process for bio-oxidation as claimed in claim 15 wherein said thermophilic microorganisms include moderate and extreme thermophilic organisms.

17. A process for bio-oxidation of sulfides in mineral ore having a metal occluded or dispersed within said ore as a sulfide, comprising the steps of:
comminuting said ore into particles with a size distribution having a P80 in the approximate range of 340 to 950 microns, and minus 106 micron particles in the range of 15% to 40% by weight;
forming agglomerates by adding to said comminuted ore particles an acidic inoculate solution including water, said solution further including microorganisms capable of bio-oxidizing said sulfides;
placing said agglomerates in at least one bio-reactor containment vessel to form an ore bed;
bio-oxidizing said sulfides in said ore bed; and
re-circulating said solution through said ore bed and continuing said bio-oxidation until a desired bio-oxidation level is achieved; and
thereafter recovering said metal from said ore.

18. A process for bio-oxidation as claimed in claim 17, wherein said metal is selected from the group consisting of gold, silver, copper, zinc, nickel and cobalt.

19. A process for bio-oxidation as claimed in claim 17, wherein said agglomerates are placed in a plurality of containment vessels.

20. A process for bio-oxidation process as claimed in claim 19, wherein said metal is selected from the group consisting of gold, silver, copper, zinc, nickel and cobalt.

* * * * *